US 8,447,734 B2

(12) United States Patent
Kirshenbaum

(10) Patent No.: US 8,447,734 B2
(45) Date of Patent: May 21, 2013

(54) HDAG BACKUP SYSTEM WITH VARIABLE RETENTION

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 12/627,914

(22) Filed: Nov. 30, 2009

(65) Prior Publication Data

US 2011/0131185 A1 Jun. 2, 2011

(51) Int. Cl.
*G06F 7/00* (2006.01)
*G06F 17/30* (2006.01)

(52) U.S. Cl.
USPC .......................................... 707/640; 707/756

(58) Field of Classification Search
USPC .................................. 707/640, 756
See application file for complete search history.

(56) References Cited

U.S. PATENT DOCUMENTS

| | | | |
|---|---|---|---|
| 6,839,680 | B1 | 1/2005 | Liu et al. |
| 7,191,219 | B2 * | 3/2007 | Udell et al. ................ 709/206 |
| 2003/0101449 | A1 | 5/2003 | Bentolila et al. |
| 2003/0172145 | A1 * | 9/2003 | Nguyen ....................... 709/223 |
| 2006/0161560 | A1 * | 7/2006 | Khandelwal et al. ......... 707/100 |
| 2008/0126176 | A1 | 5/2008 | Iguchi |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: The Collective Intelligence Platform, Online, http://www.baynote.com/technology/platform/ 2010.
Hottolink Inc.; "Recognize" Online, http://www.hottolink.co.jp/english/reconize.html, 2009.
Andrejko et al.: User Characteristics Acquisition from Logs with Semantics 8. Slovak University of Technology in Bratislava.
Hongjun Lu et al: Extending a Web Browser with Client-Side Mining, Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , 2008.

(Continued)

*Primary Examiner* — Kuen Lu

(57) ABSTRACT

A storage system efficiently allocates storage space for data backup. An illustrative storage system comprises a storage and backup logic that manages data backup in the storage and converts a file to a hash-based directed acyclic graph (HDAG) so that a hierarchy of nodes of the HDAGs contain a hash of child nodes. The backup logic creates multiple HDAGs for one or more of a plurality of retention policies and represents directories by a first node containing a payload of metadata and weak references to roots of child nodes, and a second node containing references to the first node and to any HDAGs corresponding to files and/or directories governed by an active policy of the plurality of retention policies.

14 Claims, 14 Drawing Sheets

OTHER PUBLICATIONS

Shahabi et al.; "Yoda an Accurate and Scalable Web based Recommendation System?" University of Southern California, Los Angeles, Sep. 2001.

Why WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

HDAG BACKUP SYSTEM WITH VARIABLE RETENTION

BACKGROUND

Backup refers to copying data to enable data recovery (restoration of original information after a data loss event), archiving (ensuring a particular system version is available if needed subsequently), historical reference (accessing contents of a file as of a particular point in the past), communication of files between systems, and the like. The additional copies are typically called backups and are useful for various purposes including restoring a state following a disaster (called disaster recovery) and restoring small numbers of files after accidental deletion or corruption. Data storage requirements are substantial since a backup system is intended to hold at least one copy of all data worth saving. Organizing storage space and managing the backup process are complicated and may address aspects of geographic redundancy, data security, and portability.

One decision made in a backup system is the time period for keeping backup files. Keeping data for too long can result in running out of storage space. Keeping data for too short a time can cause needed versions of a backed-up file to be unavailable.

In conventional backup systems, a backup client typically has responsibility to decide, upon doing a backup, that some information that would allow the restoration of some versions of backed-up files should be deleted, either because the files are too old or because too many versions exist. Each backup location (the logical storage location in which the backup files for a particular system are kept) is assumed to be under control of a particular client and is an image of a particular system, resulting in the disadvantage that no sharing between backups for different systems is available. A second disadvantage is that recovery of prior states of directories is difficult since the typical approach of representing a directory by a remote directory and a file by files representing prior versions leaves no way to indicate that a given file that had been in the directory no longer is present.

A conventional version control system uses a database to keep track of prior versions of files and directories and enables browsing of prior versions and a capability for a consistent view of a directory as of a particular date and time. The system assumes that prior versions are kept forever (or until manually deleted or deleted by rule-based program invocation) and relies on explicit "check-in" of new versions.

Some conventional operating systems maintain multiple versions of files by keeping version numbers in the files' metadata, incrementing the version number each time a file is opened for writing, and deleting old files when a maximum number of existing versions is exceeded. The technique only works for files modified by completely generating new content, and sharing between versions is not possible. Versioning directories and deleting old versions based on age are not supported.

BRIEF DESCRIPTION OF THE DRAWINGS

Embodiments of the invention relating to both structure and method of operation may best be understood by referring to the following description and accompanying drawings.

DETAILED DESCRIPTION

Embodiments illustrate a storage system that utilizes a support HDAG backup with varying retention policies. An illustrative storage system comprises a storage and backup logic that manages data backup in the storage and converts a file to a HDAG so that a hierarchy of nodes of the HDAGs contain a hash of child nodes. The backup logic creates multiple HDAGs for one or more of a plurality of retention policies and represents directories by a first node containing a payload of file and subdirectory metadata and weak references to roots of child nodes, and a second node containing references to the first node and to any HDAGs corresponding to files and/or directories governed by an active policy of the plurality of retention policies.

HDAG-based (single instance) backups can be made with a capability to specify different retention policies for different types of files, for example based on time and number of prior versions.

Figure 8:
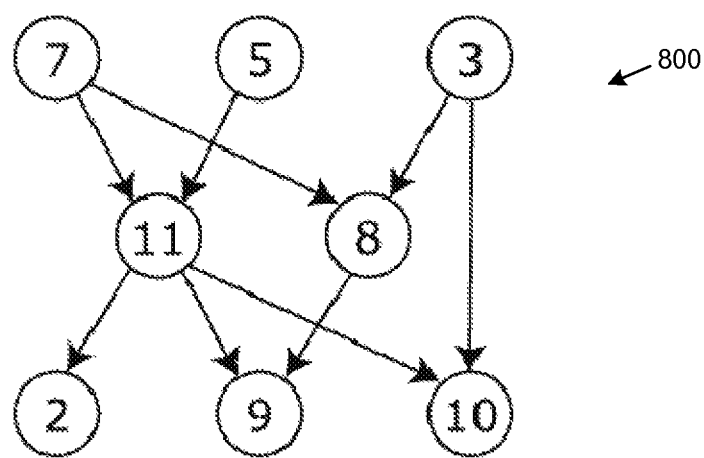
FIG. 8 is a pictorial diagram showing an example of a simple directed acyclic graph.

An HDAG is a directed acyclic graph (i.e., a directed graph 800 that does not contain cycles as shown in FIG. 8) in which edges between nodes are represented by the result of applying a cryptographic hash function to some or, typically, all content of the destination node. A cryptographic hash function is a function from, for example, a sequence of bytes to a number or other identifier smaller than typical data, called the "hash" or "digest" of the data, that has three important properties. First, it is deterministic, so hashing the same data will result in the same hash. Second, it is impossible or at least computationally intractable to reverse the function and determine, even to within a usable probability, the data that resulted in a given hash. And third, the likelihood of two distinct sequences of bytes mapping to the same hash value is small enough to be negligible. Examples of cryptographic hash functions are the various Message Digest algorithms (e.g., MD-4, MD-5) and the Secure Hash Algorithms (e.g., SHA-1, SHA-2). A node in an HDAG contains a "payload" of data along with the hashes of child nodes (i.e., nodes that are the destination of an edge for which the node is the source). The hash of a node is the result of applying a cryptographic hash function to the payload and the child hashes. (In some embodiments the node may contain other information that is also considered input to the hash function. In some embodiments some of the payload or child hashes may be excluded from the computation of the hash.). A result of this data structure is that if an HDAG contains a node and an attempt is made to insert a node that would hash to the same digest, the representation of the HDAG need keep only one copy. This allows a significant amount of sharing and a significant optimization wherein the representation, having information of such a match and further having all nodes that are descendents (i.e., the transitive closure of children) of that node, need not add an entire substructure. The HDAG rooted at a node (which may be a substructure of a larger HDAG) is said to be "complete" within a representation if it is in the representation and all of its children (if any) are complete within the representation. In some embodiments, some of the children may be excluded from this determination.

An HDAG store is a data store that presents its contents as an HDAG. Among other operations, it allows the users to query the existence of nodes, retrieve nodes, and store nodes. As used herein, a user is a software program executed on a computer system, or a physical person. To query, a program querying the store (typically on behalf of a user) constructs the node locally, applies the store's published hash function to obtain a hash, and passes this hash to the store, which checks to see whether the store contains a corresponding node. In some embodiments, the HDAG store also provides ways for users to query whether the store contains a complete HDAG rooted at the node corresponding to a hash and to take steps to ensure that the node, if present, does not disappear for some controlled amount of time. To retrieve a node, the user passes in the hash of the node, which the user has obtained by some means (typically as a child hash in some other node), and the store responds by transmitting the bytes (e.g., payload and children) that constitute the node. In these embodiments, the store also provides a way for users to retrieve part or all of the HDAG rooted at a particular hash. To store a node, the user passes in the data that constitute the node, and the store constructs and, if not already present, inserts the node and. The store further can enable the user to indicate that the store should take steps to ensure that the nodes stored do not disappear for some controlled amount of time. The HDAG store can take steps to ensure that a node remains in the store if it is a child node of any node in the store. In some such embodiments, the children of a node may be identified as "strong" or "weak" children (alternatively strong or weak "references" or "pointers" or "edges" or "links"). In such an embodiment, the general guarantee only applies to nodes that are strong children of some node in the store. Note that a node may be both a strong child and a weak child simultaneously, with respect to the same or different nodes. The data corresponding to a node, as sent and received by a client of a store is often referred to as a "chunk", reflecting the fact that in backup operations in many cases the data represents a contiguous section of the contents of a file. Such chunks (or, equivalently, the nodes that represent the chunks), may be considered to be the basic unit of storage for an HDAG store. In this specification, references to HDAG store operations (e.g., queries, retrievals, stores) with respect to hashes (equivalently "references", "pointers") should be considered equivalent to references to the same operations being performed with respect to HDAG nodes referred to by those hashes.

A backup system may be embedded in an HDAG store by constructing an HDAG that represents a file system to be backed up as well as other information about the backup itself and ensuring that this HDAG is stored in an HDAG store. As described herein, unless context dictates otherwise, the phrases "HDAG store" and "store" should be read to indicate an HDAG store used as the back end of such an HDAG backup system, although the store itself may also contain HDAGs that do not relate to backups.

In contrast, an HDAG backup system that does not include the disclosed improved operation maps a file to an HDAG by first breaking the contents of the file into "chunks" (contiguous sections of file content) by some algorithm, each of which is taken to be the payload for a leaf node (i.e., a node that has no children). A node is constructed that has these leaf nodes as children and that node is taken to be the root of the file's corresponding HDAG. If that root node is considered to have too many children (e.g., when the file is too large), the file is broken up into chunks (by the same or, preferably, a different chunking algorithm) and new nodes are formed in place of the old root, and a new root is created that has the new nodes as children. The process iterates as necessary. To map a directory into an HDAG, a node is created that contains the hashes of root nodes of HDAGs for any files or subdirectories of the directory, along with metadata (e.g., name, last modification time, owner, permissions) for each file and subdirectory. This node is split as necessary as described above, and eventually a single root is obtained.

Utilizing an HDAG store for backups can partially obviate the problem of determining how long to maintain backup files by allowing a great deal of sharing between backups, both between systems and between different backups on the same system, since identical content will result in the same HDAG and, therefore only needs to be stored once. Since a great deal of sharing takes place, it takes more time for available space to be exhausted. However, resource constraints and decisions for allocating backup file duration remain. One example decision-making technique replaces the notion of "delete a backed-up file" with "remove the guarantee on keeping the file", but the difficulty in determining a suitable time for maintaining the backup files remains. Some files are more important than others, and users typically rely on guarantees that the needed files are available or that prior versions of significant files are kept a longer time. In common with other aspects of an HDAG store, different users may have copies of the same content and different objectives about how long particular content should be kept.

The disclosed HDAG backup with varying retention policies further addresses a difficulty introduced by the HDAG paradigm. On many traditional backup systems, storage is configured as a single file system with multiple files (or directories), each having multiple versions. When a new version of a file is noted, the current (i.e., new) version is backed up and the oldest backed up version, if no longer needed (either too far in the past or too many versions ago), is deleted. With the single file system, prior versions of a file are easily reviewed. While HDAG store can easily handle a request such as "show the file system as of last Tuesday", a request in the form of "show the last three versions of a file" is difficult since the identity of the corresponding backups is unknown.

In an example HDAG backup scheme (which does not enable varying retention policies), each backup is represented as a single HDAG with a single root. The HDAGs may and probably will overlap. Files are represented as HDAGs within the overall backup HDAG, and directories are HDAGs that include references to HDAGs representing each directory's file and directory children. The HDAG store disclosed herein provides the concept of a "retention group" with which stored (or discovered) HDAGs may be associated, and the store guarantees (or attempts to guarantee) that all nodes within an HDAG associated with a retention group will remain available as long as the retention group is managed by the store. In the example scheme, the only way the store stops managing the retention group is by an explicit request by a user or administrator to delete the retention group. Such retention groups may be described as "manually managed retention groups". The backup HDAG is associated with such a manually managed retention group. Note that a node or HDAG may be part of HDAGs associated with several retention groups. When the last retention group associated with an HDAG that includes a node is deleted, the node is considered to be garbage and the retention group is deleted. In another implementation, the version is subject to later garbage collection. Thus in the example scheme, the only available policy for backed-up files is to keep the entire backup until explicitly requested otherwise.

Another disadvantage of the example HDAG backup scheme (that does not enable varying retention policies) is that the only ways to access a file (or directory) are (1) by providing the hash of the root node of the file's HDAG, which refers to a particular state of the file without indication of time or context (since HDAGs are shared, the notions of time and context are meaningless since a file with identical content may be found in multiple places with multiple names at multiple times), or (2) by providing or requesting the root hash for a particular file system as of a particular backup and walking down the root hash to find the desired file by a known path. As an example of this second approach, if the desired file is known to have been namable as "/users/smith/documents/agenda.doc" relative to the root of a particular backup, the client may obtain the node or nodes corresponding to the top-level directory of the backup and reconstitute original record containing metadata information and child references. The client may then look at the metadata information and determine that the child named "users" corresponds to the fourth child (hash) reference, and can then provide this hash to the store to retrieve another directory record, iterating until it comes to the root of the HDAG corresponding to the desired "agenda.doc". Note that it will be common for a given file HDAG to be retrievable this way via multiple paths from multiple backup HDAGs. The second alternative enables straightforward handling of a request such as "get the state or condition of the file in last Tuesday's backup and compare to the version in last Monday's backup". However since each backup will have a file state, no simple way is available to address a request of the form "the last different file state before the file state in last Tuesday's backup".

"Retention groups" are associated with "retention policies" which specify conditions under which the store's guarantees about the retention of associated HDAGs are removed. In other systems, the retention policy is implicit and the implicit retention policy associated with all retention groups is that the retention groups remained in force until explicitly deleted. This is generalized in the present description by making the retention policy explicit. As long as a retention group's retention policy has not expired, associated HDAGs may not be considered to be "garbage" and the store must take steps to ensure that the HDAGs (and the nodes they contain) remain available. An example of a retention policy is "remain valid for one month". In some embodiments a separate retention policy may be created for each retention group, e.g., "remain valid for one month from 30 Jun. 2009". In other embodiments, a single policy (or small number of equivalent policies) specifies "remain valid for one month from" some specified parameter and multiple retention groups are associated with this policy and implicitly or explicitly specify the value of the parameter. Once the month-long time duration has expired for a retention group associated with this policy, anything in an associated HDAG becomes subject to garbage collection unless it is also in an HDAG associated with another retention group that has not expired. Thus a user making daily backups with one-month retention is guaranteed to be able to roll back to any day's backup within the last month.

The example HDAG backup scheme mentioned above has several other drawbacks that are addressed in the storage system disclosed herein that enables varying retention policies. One drawback is that the example scheme is all-or-nothing. If a directory is stored, all backed-up files, including those recursively in backed-up subdirectories, are kept for the same minimum time, even though some may be more important than others. Another drawback is the difficulty in specifying policies of the form "keep at least five versions of this file", and in listing prior versions of a file.

Figure 1:
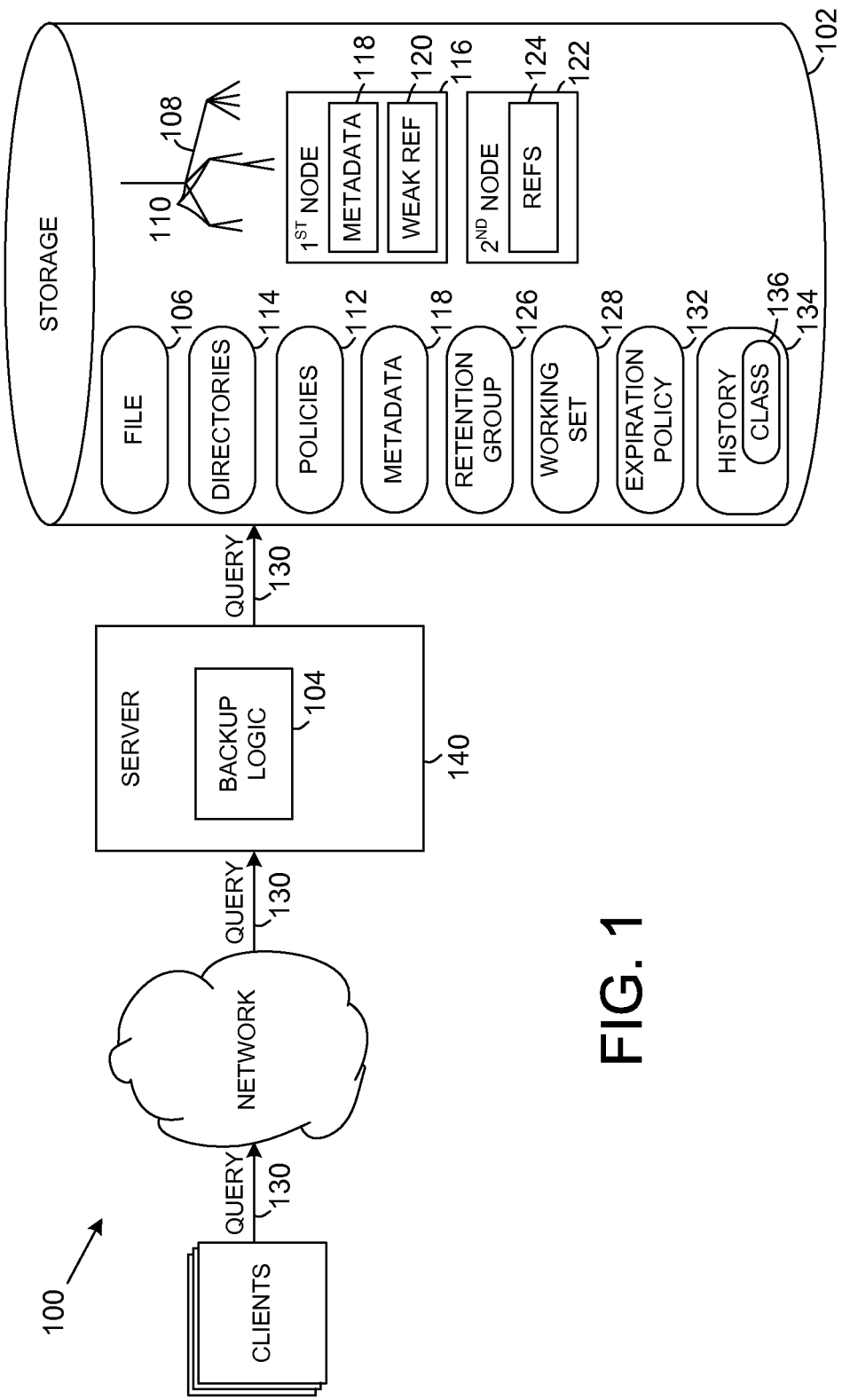
FIG. 1 is a schematic block diagram showing an example embodiment of a storage system that efficiently allocates storage space for data backup.

Referring to FIG. 1, a schematic block diagram illustrates an embodiment of a storage system 100 that efficiently allocates storage space for data backup. The illustrative storage system 100 comprises a storage 102 and backup logic 104 that manages data backup in the storage 102 (the HDAG store) and converts a file 106 to a hash-based directed acyclic graphs (HDAG) 108 so that a hierarchy of nodes 110 of the HDAGs 108 contain a hash of child nodes. The backup logic 104 creates multiple, possibly overlapping, HDAGs 108 for one or more of a plurality of retention policies 112 and represents directories 114 by a first node 116 containing a payload of metadata 118 and weak references 120 to roots of child nodes, and a second node 122 containing references 124 to the first node 116 and to any HDAGs 108 corresponding to files 106 and/or directories 114 governed by an active policy of the plurality of retention policies 112. This backup logic 104 may be executed on a server 140 that may be a data base server, application server, or other suitable server. The storage 102 may be many physical devices including some that are transient or removable, and may be federated between several independent systems.

The backup logic 104 can represent directories 114 by the first node 116 containing weak references 120 that enable contents to be obtained if existing in the storage 102 but do not prevent the contents from expiring from the storage 102.

The backup logic 104 can store a backup and associate nodes 110 of a hash-based directed acyclic graph (HDAG) 108 with a retention group 126 using a multiple-pass process that operates upon retention groups 126 and working sets 128, each of which are individually identifiable. A working set 128 is defined in more detail in the examples hereinafter and generally relates to a uniquely identified construct which enables the retention of nodes before the completion of storage of an HDAG that can be associated with a retention group 126. The working sets 128 can be configured to support more than one retention group 126 and have an individually-associated retention policy 112.

As queries 130 are made and nodes 110 are stored, the queries and nodes may be associated with a working set 128. The store 102 ensures that as long as the working set 128 is valid, the nodes 110 contained in the working set 128 are not collected. The working sets 128 have an individually-associated metadata 118 and an explicit expiration policy 132. Note that the explicit expiration policy 132 may not necessarily be explicitly specified by the user, and may be imposed by the store 102.

The backup logic 104 can include in the working sets 128 data including metadata 118 which indicates start and last add time, information about a user who creates the working sets, an identifier of system under backup, and the like.

In an example implementation, the backup logic 104 can perform a backup operation by sequencing through at least part of a directory tree, creating at least one hash-based directed acyclic graph (HDAG) 108 for parts of the backed-up system intended to be governed by each retention policy 112. After the backup is complete, the backup logic 104 can identify one or more retention groups 126, each associated with one or more HDAG roots and associated with a retention policy specifying duration of HDAG retention. Then the backup logic 104 can request the storage 102 to construct retention groups 126, identifying in the request retention policy, roots, and group-identification metadata.

The backup logic 104 can request the storage 102 to construct retention groups 126, selectively identifying expiration of the retention groups or enabling the storage 102 to vary expiration according to rules specified by the storage 102.

Sets of roots, metadata, expiration, and/or retention policy for a retention group 126 can be modifiable after creation of the group 126.

A history or chronology 134 is a concept, discussed in more detail hereinafter, that can be used to encapsulate the notion of a number of related unexpired retention groups, associated retention policies, and related metadata representing multiple backup events for a given system. The backup logic 104 can maintain a chronology 134 which encapsulates a record for multiple related unexpired retention groups 126 in combination with associated retention policies 112 and metadata 118. The chronology 134 can include multiple content classes 136 that can be modified and/or deleted in response to assertion of backup against the chronology 134. The content classes 136 contain a list of unexpired retention groups and expirations. The notion of content classes 136 relates to a syntactically-identifiable (e.g., by name, path, owner, age, and the like) set of files that have similar value to the user and should therefore be preserved using the same retention policy.

The backup logic 104 can guarantee that files existing at the time of backup are kept for a selected control duration.

The backup logic 104 can guarantee that a selected number of prior versions are available for roll-back.

Figure 2A:
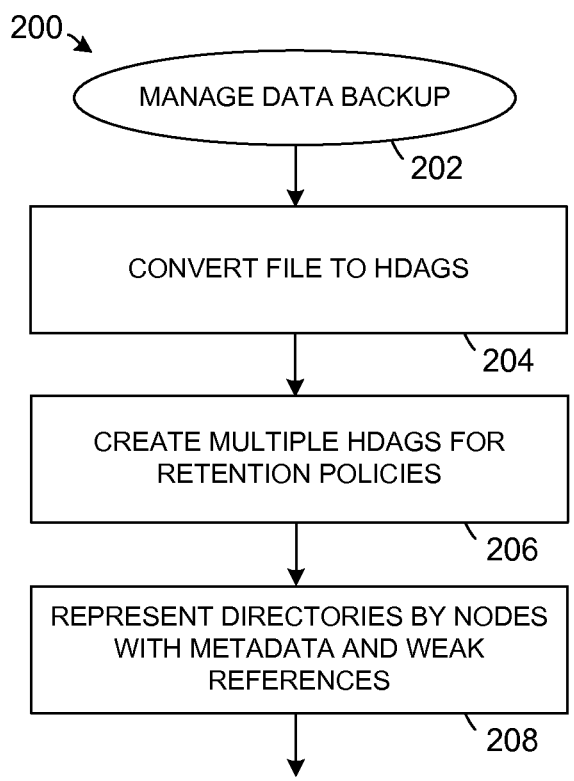
FIGS. 2A through 2C are multiple flow charts depicting example aspects and embodiments of data processing methods for managing data backup.
Figure 2B:
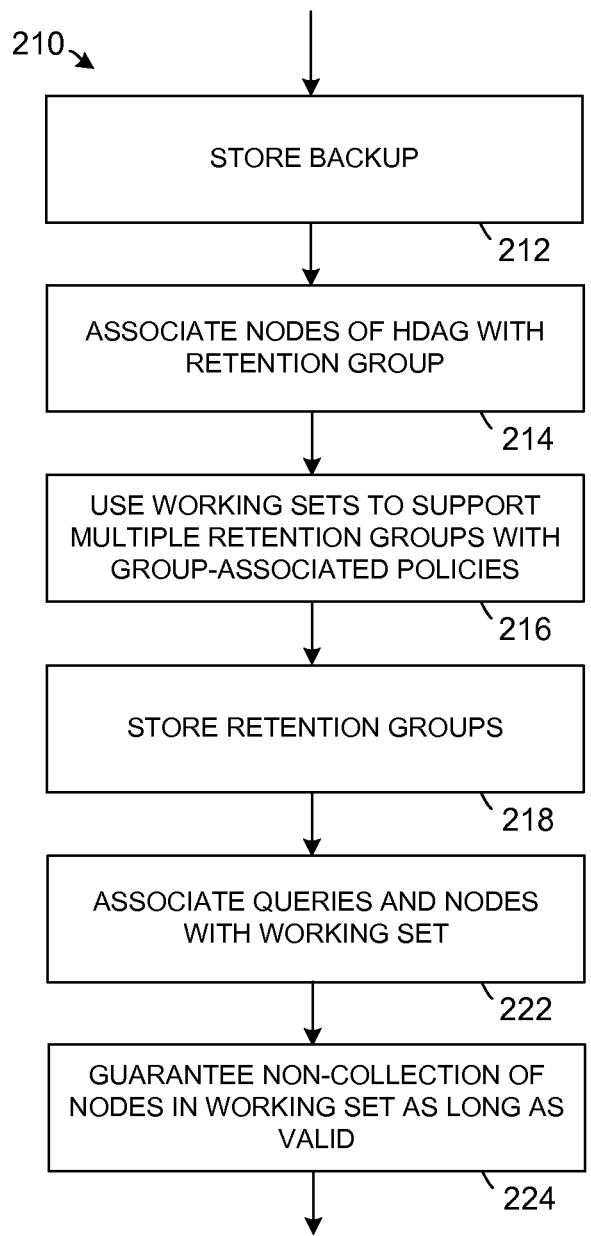
Figure 2C:
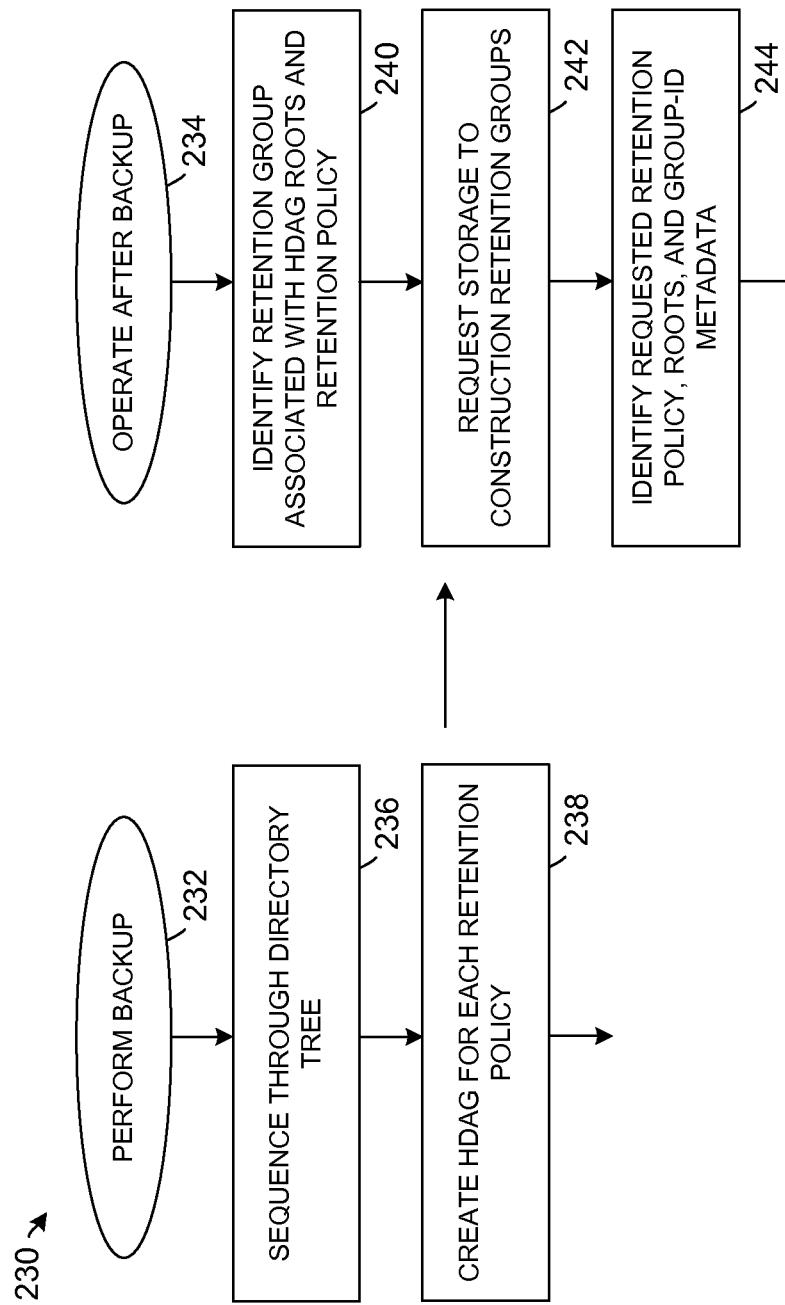

Referring to FIGS. 2A through 2C, multiple flow charts depict aspects and embodiments of data processing methods for managing data backup that are executed on the server 140. FIG. 2A is a flow chart illustrating an embodiment of a data processing method 200 for efficiently allocating storage space for data backup. The data processing method 200 manages 202 data backup comprising converting 204 a file to HDAGs wherein a hierarchy of nodes of the HDAGs contain a hash of child nodes. Multiple HDAGs can be created 206 for one or more of multiple retention policies. Directories can be represented 208 by a first node containing a payload of metadata and weak references to roots of child nodes, and a second node containing references to the first node and to any HDAGs corresponding to files and/or directories governed by an active policy of the plurality of retention policies.

In some embodiments or applications, as shown in FIG. 2B, an embodiment of a backup management method 210 can comprise storing 212 a backup and associating 214 nodes of a hash-based directed acyclic graph (HDAG) with a retention group in a multiple-pass process operating upon retention groups and working sets, each of which are individually identifiable. The working sets can be used 216 to support more than one retention group and have an individually-associated retention policy. The method 210 can further comprise storing 218 retention groups and associating 220 queries as made and nodes as stored with a working set. The storage can guarantee 222 that as long as the working set is valid, the nodes contained in the working set are not collected. The working sets having an individually-associated metadata and an explicit expiration policy.

Referring to FIG. 2C, a schematic flow chart depicts another embodiment of a backup management method 230 further comprising actions of performing 232 a backup operation and operating 234 after backup. The backup operation can be performed 232 by sequencing 236 through at least part of a directory tree, and creating 238 at least one hash-based directed acyclic graph (HDAG) for each retention policy. Subsequent 234 to backup, at least one retention group is identified 240, each associated with one or more HDAG roots and associated with a retention policy specifying duration of HDAG retention. The storage is requested 242 to construct retention groups, and the requested retention policy, roots, and group-identification metadata are identified 244.

Figure 3:
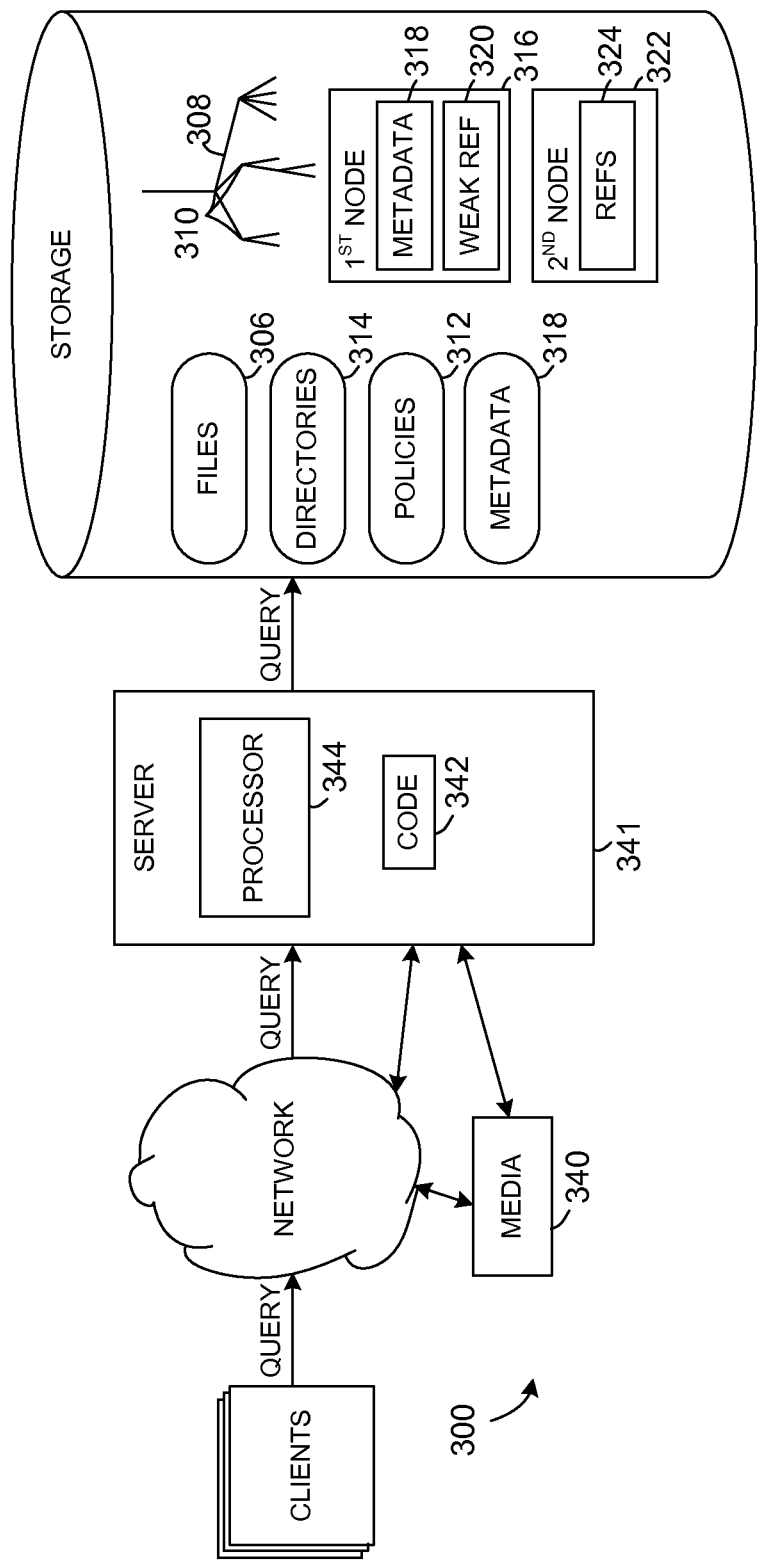
FIG. 3 is a schematic block diagram illustrating an example embodiment of an article of manufacture that can be used for efficiently allocating storage space for data backup.

Referring to FIG. 3, a schematic block diagram illustrates an embodiment of an article of manufacture 300 that can be used for efficiently allocating storage space for data backup. The article of manufacture 300 comprises a processor-usable medium 340 having a computer readable program code 342 embodied in the processor 344 for managing data backup. The processor-usable medium 340 having a computer readable program code 342 embodied in the processor 344 may be executed on a server 341 that may be a data base server, application server, or other suitable server. The computer readable program code 342 comprises code causing the processor 344 to convert a file 306 to hash-based directed acyclic graphs (HDAGs) 308 wherein an hierarchy of nodes 310 of the HDAGs 308 contain a hash of child nodes. The computer readable program code 342 further comprises code causing the processor 344 to create multiple HDAGs 308 for one or more of multiple retention policies 312 and represents directories 314 by a first node 316 and a second node 322. The first node 316 contains a payload of metadata 318 and weak references 320 to roots of child nodes. The second node 322 contains references 324 to the first node 316 and to any HDAGs 308 corresponding to files 306 and/or directories 314 governed by an active policy of the plurality of retention policies 312.

Embodiments of the illustrative storage system 100, methods, and article of manufacture 300 have several advantages over conventional techniques. For example, different files can be associated with different retention policies within the same backup. Also retention policies of directories are independent of the retention policies of the content so that the names and hashes of all files in a directory can be viewed even if some of the content is no longer in the store. Directories can be restored to a selected status, even "as much as is currently present". The amount available may exceed what the retention policy for the backup requires. A further advantage is the capability to guarantee that a selected number of prior versions be retained according to an expiration date. The illustrative systems and methods also enable enumeration of prior versions of a file or directory even past the number mandated to be kept (if the versions are kept due to other retention policies).

Figure 4A:
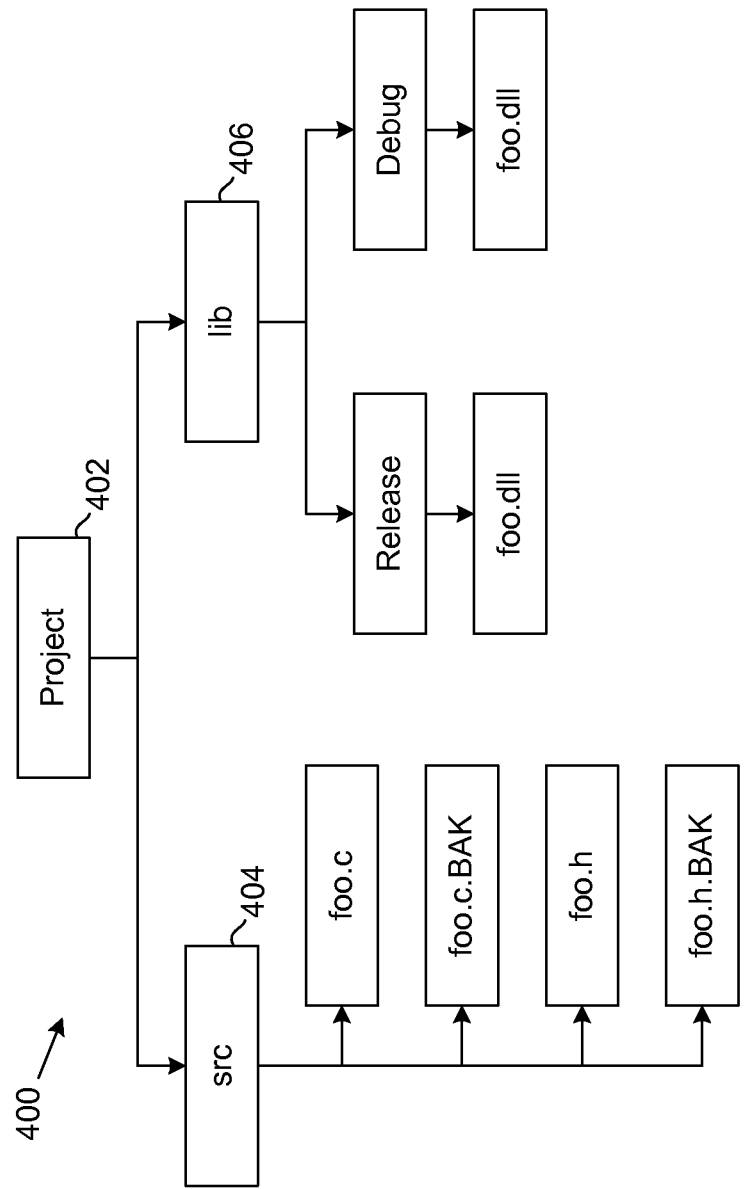
FIGS. 4A and 4B are block data diagrams respectively showing an example directory structure and a hash-based directed acyclic graph (HDAG) structure for an HDAG store.
Figure 4B:
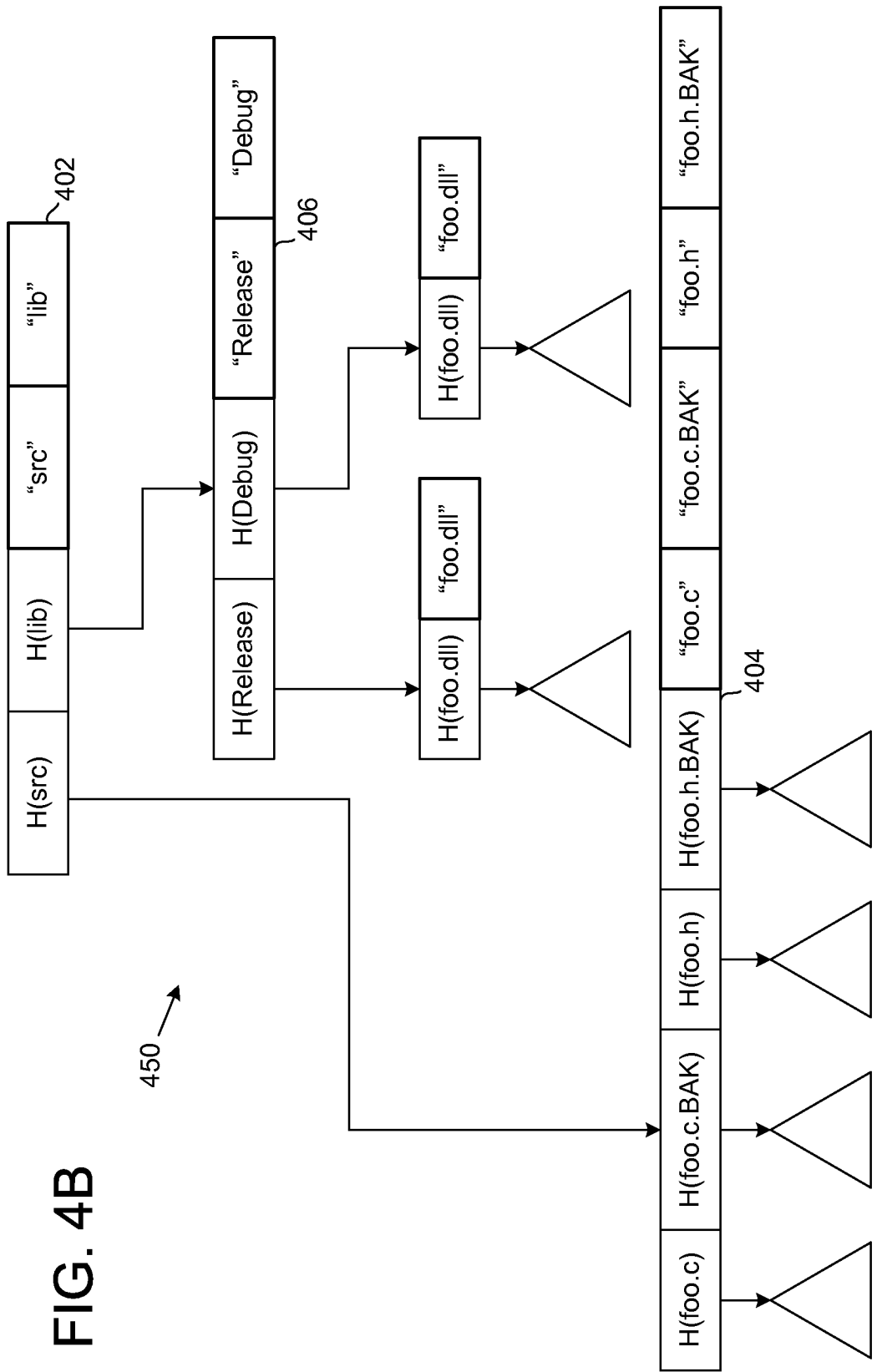

Referring to FIGS. 4A and 4B, block data diagrams respectively show a directory structure 400 and a hash-based directed acyclic graph (HDAG) structure 450 for an HDAG store. In these and other figures, adjoining rectangles represent nodes and triangles represent HDAGs whose structure is not further elaborated, where these HDAGs have a single root 402. In the depicted storage system, a file is converted to an HDAG by breaking it into chunks which form the leaves of the HDAG (for example, as shown with source 404 and library 406 leaves). A new chunk is created with the leaves as children, representing a child by a cryptographic hash. The new chunk, if sufficiently large, is in turn broken into chunks, recursively until a single "root" chunk is found that dominates all of the chunks that represent the file. This process is slightly modified when the HDAG is encrypted (as disclosed in U.S. patent application Ser. No. 11/514,634 which is hereby incorporated by reference in its entirety) but the result is the same—an HDAG representing the file, where each node contains the hash of each of the child nodes.

For directories, the same process occurs but the initial contents that are chunked are the metadata for the directory's files and subdirectories (such as name, modification time, owner, and permissions) and (hash) references to the root nodes for the directory's files and children. In the context of the present disclosure, "file" and "directory" may be read as referring to the HDAGs that represent them, created by these or other conversions. Further, "file" and "directory" may be read as referring to "files" and "directories" that are backup.

The logic of the HDAG store specifies that if a node is not garbage then the children are also not garbage, so as long as the root of an HDAG is kept in the store, all the rest of the nodes are in the store.

The directory structure 400 results in the HDAG structure 450, which can be improved using the techniques described in the discussion of FIGS. 5A through 5D.

Multiple Retention Policies

Referring to FIGS. 5A through 5D, several block data diagrams depict HDAG structures 500 for a backup system evolving over time in a storage system that implements multiple retention policies. In a simple example for illustrative purposes, the desired retention policies can be that source code versions 502 are kept for at least a year, generated files (such as libraries) 504 are kept for at least a month, and backup files need not be kept at all.

Figure 5A:
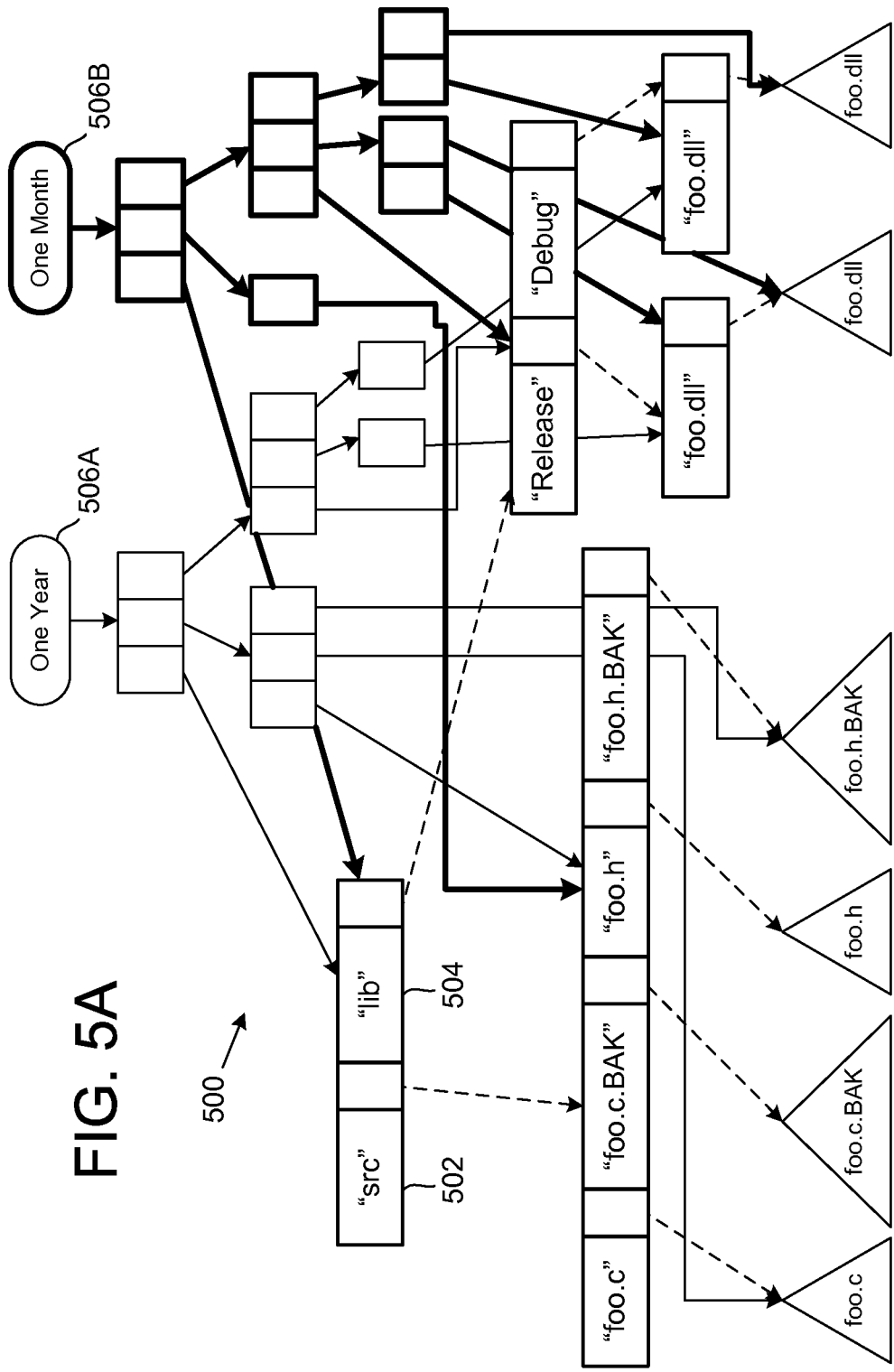
FIGS. 5A through 5D are block data diagrams depicting an example HDAG structures for a backup system evolving over time.

The multiple retention policies can be accomplished by creating multiple HDAGs 506A, 506B, one for each such policy and containing the files and directories desired to be governed by that policy. If a retention policy indicates that certain files need not be backed up, no HDAG associated with that policy is created and files governed by that policy are not included in any HDAG unless they are also intended to be governed by another policy. The representation of directories can be changed to create the HDAGs. In the example, each directory is represented by two nodes. The first node 502 is a leaf node and contains within a payload of the metadata as well as weak references to the roots of its children. The references enable the contents to be obtained if the contents still exist in the store, but do not prevent the contents from expiring from the store. The second node 504 contains references to the first (metadata) node as well as to any HDAGs corresponding to files or directories that are governed by the current policy. The result is an HDAG 500 as shown in FIG. 5A.

In the illustration, dashed lines represent weak references, thin solid lines represent (strong) references under a "keep at least one year" policy, and the thick solid lines represent references under a "keep at least one month" policy. For a weak reference, contents can be accessed if still existing in the store but expiration from the store is not prevented. For a strong reference, content is guaranteed to remain as long as the node containing the strong reference remains. Thus weak references are subject to removal during garbage collection while strong references are kept. In the example, only nodes receiving a solid line are considered non-garbage. Nodes receiving only dashed lines or no lines are garbage and may go away at any time. In particular, in the depicted tree, the HDAGs for "foo.c.BAK" and "foo.h.BAK" are garbage (unless the nodes receive strong references from some other retention group).

Figure 5B:
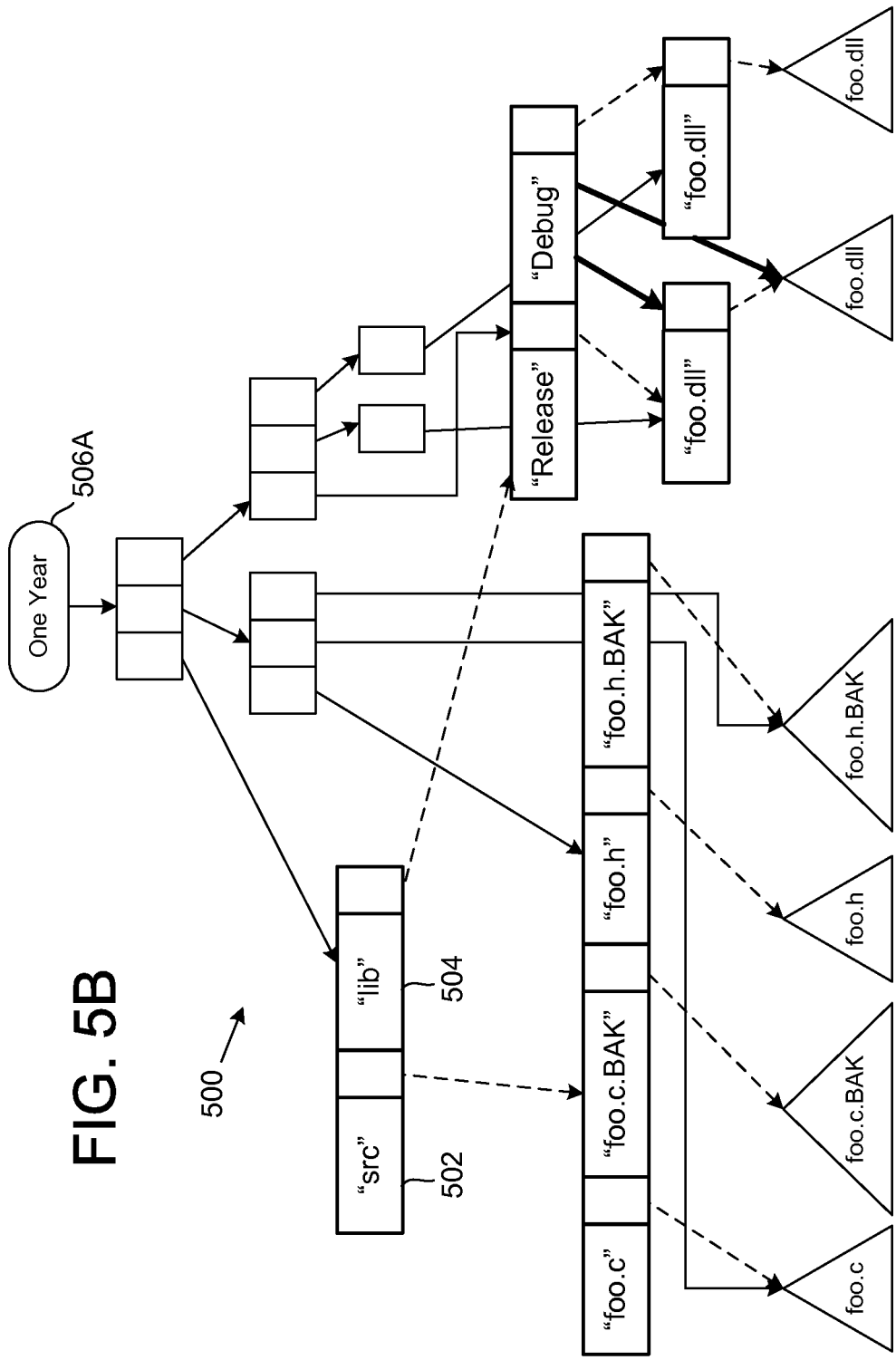
Figure 5C:
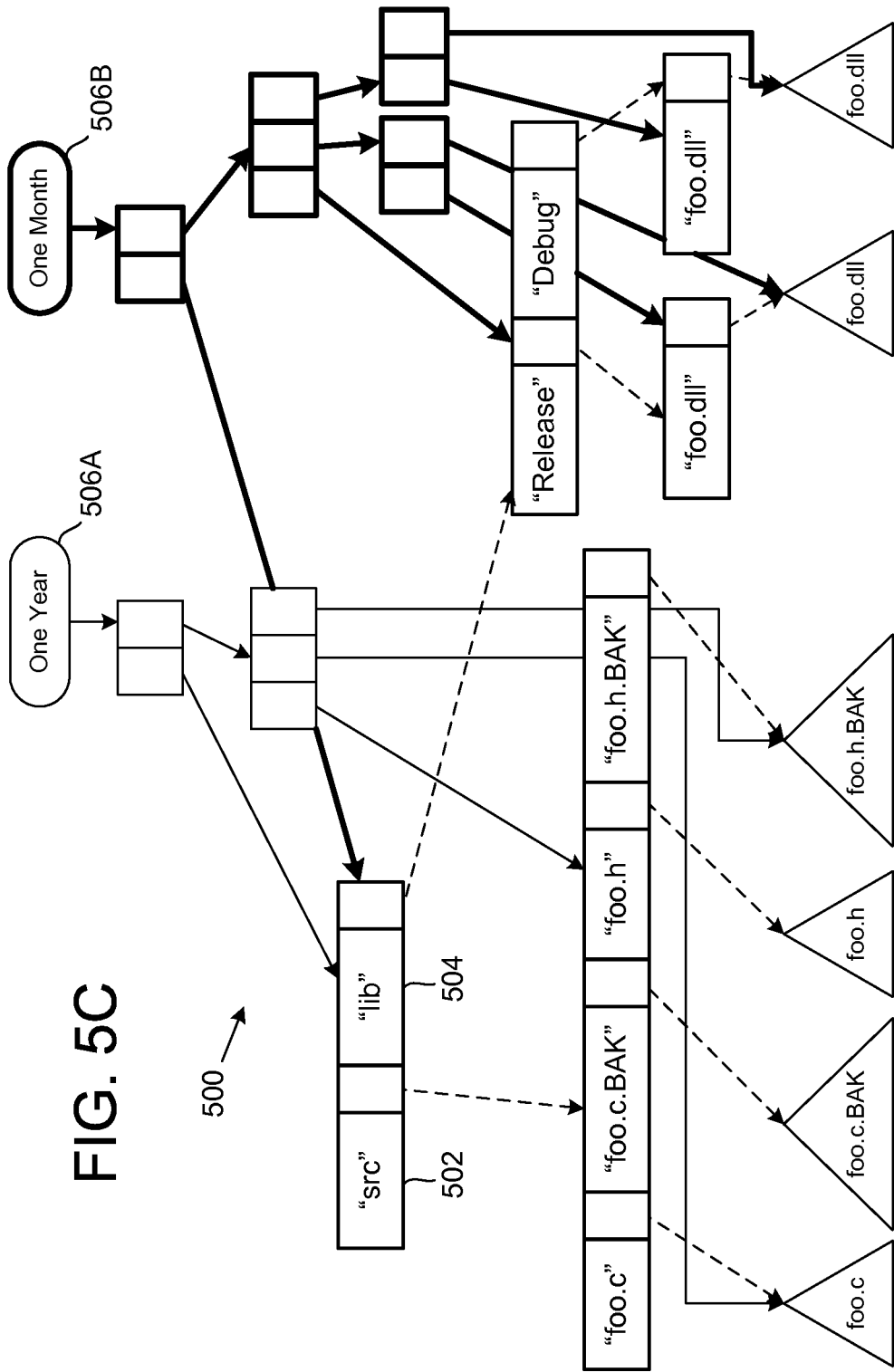

After one month, the retention group on the right expires and is removed from the system so that the graph simplifies to the form shown in FIG. 5B (again ignoring links from other retention groups). Two "foo.dll" HDAGs are shown, including one in the "Release" directory and one in the "Debug" directory, and have become candidates for deletion.

In some implementations, retention groups can be assumed to keep the entire directory structure, even if no files are stored. An opposite assumption can be made so that the entire director structure is not kept and the diagram simplifies to the form shown in FIG. 5C.

Figure 5D:
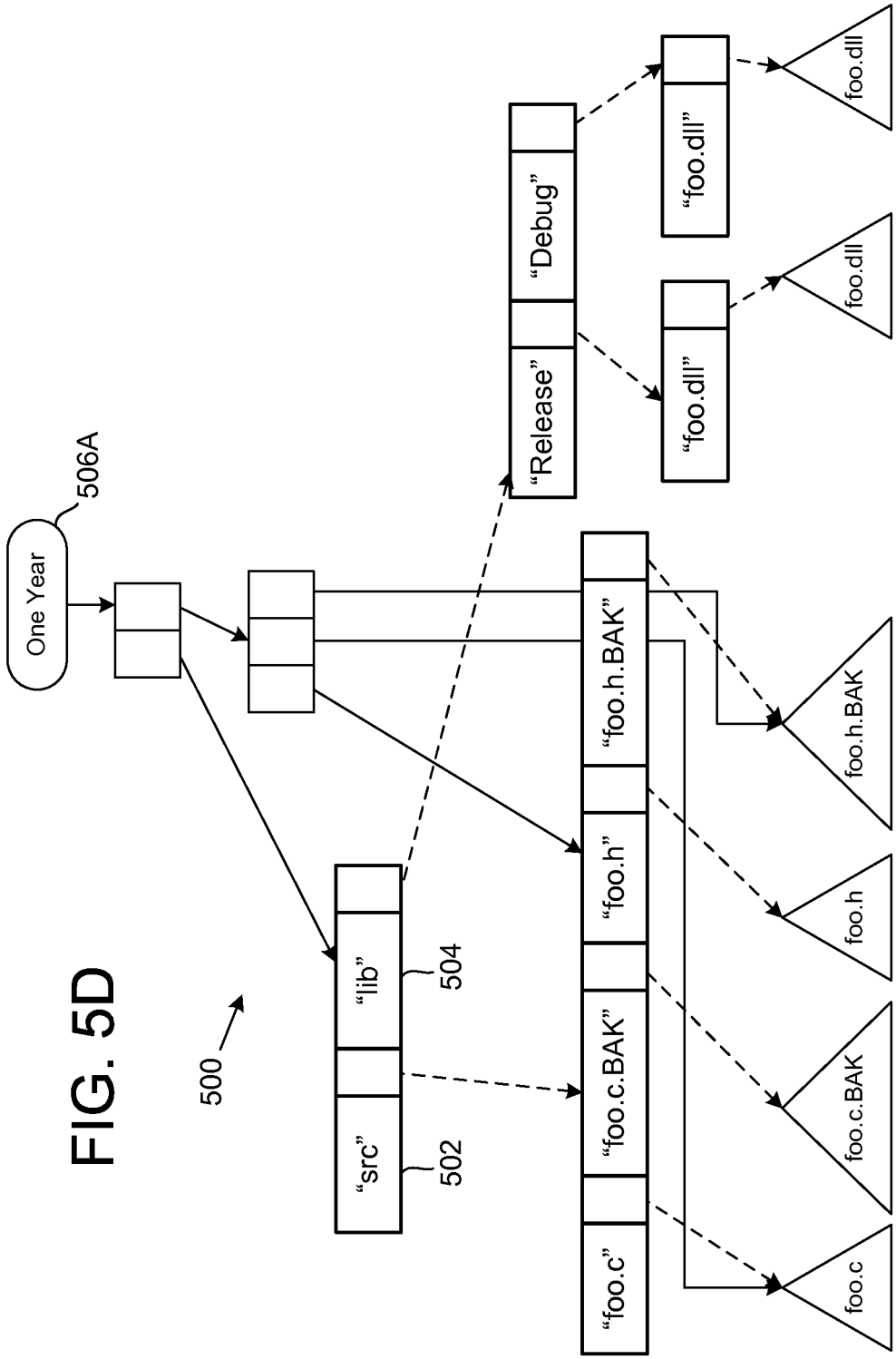

After one month, the HDAG takes the configuration depicted in FIG. 5D. Assuming no links from other retention groups, the entire "lib" directory, including subdirectories, is garbage. Either strategy (keeping the entire directory structure or not) is reasonable, as is a mixed strategy of imposing different rules for handling empty directories in different parts of the managed tree.

When using the illustrative system, the solid links representing actual "child" nodes in the HDAG) are used only to manage retention down to the level of file or director metadata. At lower levels, down to leaves, the solid links are used to point to nodes that are used to reconstitute the file. In the illustrative diagram, the solid links are used to represent links reflecting file system layout. To use a directory (for example, restore from backup or browse via a mountable file system), the weak references (dashed links) are used to pass from directory to subdirectory and ultimately to file. Since the links are weak references, the referenced HDAG describing the content (or lower levels of the file system) may not be present, having been reclaimed by the garbage collector or having never been stored. At best, the system may be able to identify the no-longer-present file (for example, "foo.h") and return some of the metadata associated with the file, and respond that the file is inaccessible. However even if the retention group has expired, the file may still be present, either because the file has not yet been collected by the lazy garbage collector or because the file is part of another retention group. The file can be part of another retention group, for example, if a later (or earlier but more persistent) file or a file from another system (or another part of the same system) that happen to have the same content and, therefore, the same HDAG.

For example, if a user wishes to restore the system to the condition of two years ago, assuming a reference to the corresponding root is available, and the policy at the time the system was backed up was that a particular file would only be guaranteed to be kept for a year. If the file did not change until six months ago (and the policy stayed the same), the contents would still be present in the retention group from backups seven months ago and would still be usable for reconstituting the two-year-old system.

Files that fall into the category of sufficiently insignificant to be backed up are assumed to be represented within the HDAG by weak references to what would be associated HDAGs, allowing the weak reference to be followed in the case in which another file with identical content is considered (by the same user or another user sharing the backup store) to be worth backing up. A problem is that the backup system has to perform the work of computing the root hash for the files. In an alternative embodiment, a null hash (or other way of distinguishing) can be used to indicate previous existence of the file but that information regarding contents of the file is not available. Another alternative is to ignore the file completely and build the directory metadata node without any reference to the file. Hybrid strategies can be used in which some files are "ignored" in one way and other files in another.

Storing Retention Groups

The retention groups can be stored to ensure that the HDAG roots for the various retention policies have the correct expiration dates and to enable roots of the file system for a particular system as of a particular backup to be found.

In a system that does not include the improvements described herein, each retention group is identified by a unique identifier (typically a hash of information describing the backup, computed by the client and uninterpretable by the store). Storing the backup and associating the nodes with the retention group is performed in two passes. In a first pass, nodes of the HDAG are identified and stored, generally using two types of requests. In the first pass, the retention group identifier and a set of node hashes are supplied, and the store responds with an indication for each hash regarding whether the retention group exists in the store. At the same time, the store associates any nodes found with the "partial" retention group being constructed, ensuring that the nodes will not disappear before the backup has a chance to complete. The second request supplies the retention group identifier and a chunk, which stores a node representing the chunk and associates the node with the partial retention group.

The example system has no specific mechanism for creating the partial retention group. Instead, if a retention group identifier that the store does not recognize is received, a new partial retention group is created.

Once the first pass is complete, the store contains the HDAG for the backup (and perhaps some extra nodes that did not become part of the HDAG), all individually associated with the partial retention group. In the second pass, a root node is constructed which contains metadata information about the retention group (such as name, date, machine) as well as a pointer to the root of the (single) HDAG representing the backup. The root node is stored and associated with the partial retention group. Finally, the retention group is "finalized", passing in the retention group identifier and the hash of the root node. At this point, the store discards all of the individual associations with the partial retention group and records the finalized retention group. Since the root contains a pointer to the backup HDAG, all nodes in the HDAG will be retained as long as the retention group is in the store, but any nodes that had been associated with the partial retention group not in the HDAG become subject to consideration as garbage.

At any given point, the store contains a number of finalized retention groups and, likely, a number of partial retention groups representing backups in progress or backups that terminated before being finalized. Each of the partial retention groups remain until explicitly deleted. Only finalized retention groups are actually self-described, so unless the information used to generate the retention group identifier is known, which partial retention group corresponds to which failed backup cannot be determined.

An improved system is disclosed wherein the unimproved system is modified in several ways. First, notions of "partial retention groups" and "finalized retention groups" are replaced by "working sets" and "retention groups". One difference is that while a partial retention group and the corresponding finalized retention group are identifiably "the same" (have the same identifier) in the unimproved version, in the improved scheme a working set is uniquely identified, enabling support of more than one retention group and independent retention policies for the working sets.

A working set operates in a manner similar to that of a partial retention group. When a query is made for nodes (specifying hashes for the nodes), a request is made to include the hashes (equivalently their respective nodes) within the working set, whether or not existing in the store. Thus, queries as made and nodes as stored may be associated with a working set, and the store guarantees that as long as the working set is valid, the nodes contained are not collected. However, unlike partial retention groups, the working sets have associated metadata and an explicit expiration policy. The working sets are either created explicitly or a system policy defines how long a newly created working set will last. Some examples of expiration policies for working sets may be "the life of the current session", "two days past the end of the session", "three hours past the last time anything is added to the working set", "one week past the creation of the working set", or the like. Since the main purpose of a working set is to hold data until a backup completes or, in the case of a failed backup, to prevent data from going away before the data can be put into the next backup, successful one, the expirations are likely be very short, for example on the order of hours or days. Different users (or backups for different systems) can have different default policies or even different allowable maximum expirations.

Working sets have other metadata that indicate start and last add time, information about the user creating the working set, the system be backed up, and the like. Thus working sets can be listed along with associated information, including information enabling an administrator to determine whether to remove the working sets manually. However, a list the contents of a working sets is generally unavailable. The working set can be used to guarantee that the nodes do not disappear, but does not enable enumeration of a working set.

When a backup crashes, a working set remains which can be useful for the next backup. The subsequent backup first finds the identifier for the working set, for example by: (1) accessing an identifier stored to the local system; (2) querying an associative map to retrieve an identifier associated with a key generated by the backup client, (3) searching the metadata associated with working sets on a store that supports such searches, or (4) always using a single identifier. When a single identifier is always used by a given client, the store will preferentially provide a method by which the client may ensure that the associated working group is cleared after a successful backup. An associative map is a system, which may be local or remote to the client, that provides the ability to associate values with keys and retrieve the values associated with keys. A database is an example of an associative map. A technique for embedding an associative map in an HDAG store is disclosed in U.S. patent application Ser. No. 12/243,903 which is hereby incorporated by reference in its entirety. In such an embedding the lifetime of the association is governed by the lifetime of the nodes that describe the association, and a client will therefore likely want to ensure that such nodes are contained within the working set to ensure that the identifier will be retrievable following a crash. Once the backup has successfully completed, however, the working set need no longer be accessed, and the nodes describing the association need not be contained within a retention group. Next, the backup ensures that the contents of the working set are sustained to the end of the backup, for example by extending the expiration of the working set.

During the backup, the system walks the directory tree or, at least the parts of the trees that have changed. In the unimproved implementation, a single HDAG is formed to represent the file system. The improved scheme creates one (or possibly more) HDAG for each retention policy, which can all be built in parallel.

Once the backup is complete, the backup system identifies one or more retention groups, each associated with one or more HDAG roots and also with a retention policy that specifies how long the HDAGs are to be retained. The backup system requests construction of the retention groups, passing in the policy, the roots, and other metadata identifying each of the groups (such as name, user, system, type of backup, and the like). In an improved implementation disclosed herein, the backup system passes in the policy and not the expiration, enabling the store to clip or extend the expiration according to rules set by the store. The backup then requests the store to disregard the working set. The operations performed upon completion of the backup may be part of the process of creating the retention groups.

In some embodiments, the sets of roots, metadata, expiration, and/or retention policy for a retention group may be modifiable after creation. Depending on desired characteristics of a particular embodiment, users or systems may be able to modify the retention group. Such users or systems may include the creator of a retention group, delegates of the creator, administrators, those possessing a particular capability or privilege, and any other suitable entity. As described, all retention groups are thus regarded as independent entities. However in other implementations, a far more structured method may be used wherein a backup is not typically a single action but rather one of a series of actions backing up "the same elements" periodically, and with the same considerations for determining how long different pieces are to be kept. To handle such a series of actions, the notion of a "history" or "chronology" is used to encapsulate the notion of a number of related unexpired retention groups, along with associated retention policies and some other metadata.

Figure 6:
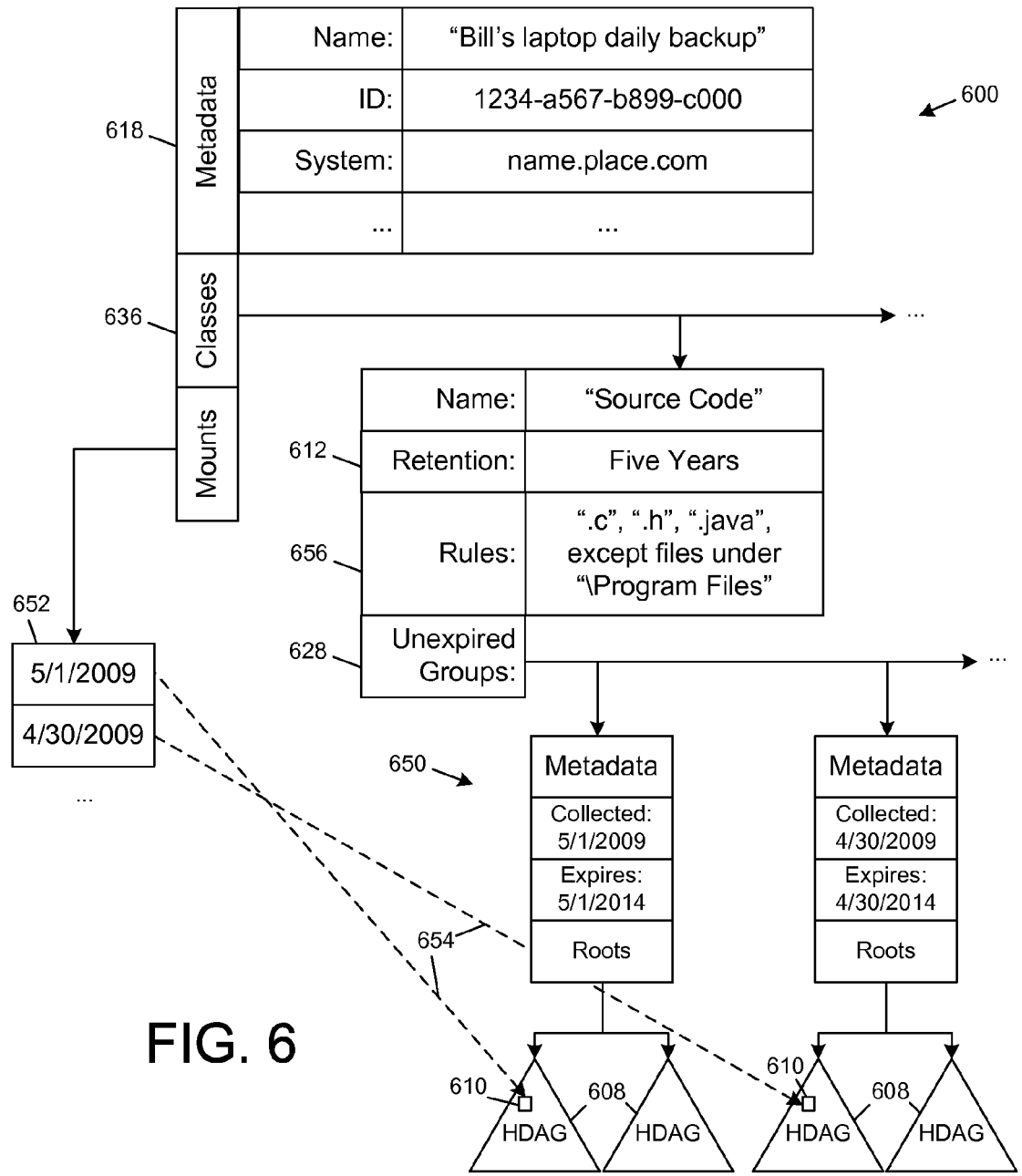
FIG. 6 is a partial block data diagram illustrating an example history or chronology containing metadata which describes the history or chronology.

Referring to FIG. 6, a partial block data diagram illustrates a history or chronology 600 containing metadata 618 which describes the history or chronology for a specific repeated backup task. The example history or chronology 600 relates to a particular user (for example, Bill and the associated "Bill's laptop daily backup") The example chronology 600 can include the metadata 618 such as a task name, an identifier (ID) identifying the history, some notion of concepts underlying the history (such as "my laptop", "the files related to this project", or the like), a textual description, information regarding when the information was created, and the like. The history 600 also contains a number of "content classes" 636, which reflect the various types of files backed up under different retention policies 612. Each class 636 has a name, a retention specification, and a description of what files should be considered to be in the class. In a general embodiment, the information can be kept in the store. In other embodiments, the information can be kept by the client or elsewhere.

When a history 600 is created, the creator specifies initial metadata 618 and constructs some initial classes 636, specifying name, retention, and rules. New classes 636 can be added later, and classes 636 can also be modified or deleted. When a modification affecting retention time (including the special case of deletion) specifies that effects are limited to subsequent instances of the class 636, a desirable implementation creates a new class and renames the old class, or the old class is otherwise marked as a no-longer-valid class.

When backups are asserted against a history 600, several actions are taken. First, each class 636 contains a list of unexpired retention groups 628, along with the associated expirations. A retention group 628, when expired, is taken out of the list. Until the retention group 628 expires, the nodes in the HDAG(s) 608 for the retention group 628 are guaranteed to not be garbage. If retention time of a class 636 is modified and that modification is specified to apply retroactively, the list of retention groups 628 is walked, and the expiration time is changed. In some embodiments, the history 600 can also have an expiration-ordered list 650 of all retention groups 628 in all classes 636 to efficiently determine when the next retention group 628 is to expire. In some embodiments, the list 650 can be a global list of all retention groups 628 in the store.

The history 600 can also include a time stamped list 652 of "mount points" 654, which are directory nodes 610 with weak pointers to contents. References to the mount points 654 from the list 652 are also weak references pointing, in some embodiments, to nodes within the HDAGs 608. Such directory nodes 610 represent the logical root of the file system being backed up. Thus, if the history 600 is considered as a file system, the directory structure can be walked as the structure existed at a particular point in time by starting from the mount point and following a named path. Of course, since weak references are used, sufficiently old mount points may no longer exist, or the mount point may still exist but parts below may have been collected as garbage. The number of such mount points 654 kept may be a specifiable property of the history 600 or may be set by the system. In some embodiments, the backups described by a history 600 may logically have multiple roots. In such cases, the list of mount points 654 can contain multiple distinguishable references or one list 654 may be associated with each mount point.

When the first pass of a backup is finished and the working set is complete, one or more of several actions take place. A history 600 is identified, being created if necessary. In some embodiments, proof is furnished to establish authority to add groups to the history 600. A reference time can be supplied. In some embodiments, the reference can be the current time, but in other implementations the reference time can be selected from the past, for example the time a backup began or the time the backup was taken if the system was off-line. Other metadata 618 can be supplied which identifies the user initiating or responsible for the backup, the time the backup started, and the like. For some or all of the classes 636, one or more hashes can be supplied to use to refer to the roots of HDAGs 608 that are to be kept until the retention time for respective content classes 636 is exceeded. Retention groups 628 can be created for each mentioned content class 636 using the reference time and the provided HDAG roots. The groups are added to respective content classes' lists. A hash of a directory node can be supplied to use as a mount point 654, in which case a time-stamped record can be added to the list 652 of mount points 654. A working set identifier (ID) can be supplied, identifying the working set (or sets) used during the backup, and the identified working set is deleted.

The history interface enables retrieving the classes 636 and associated content descriptions, enabling a backup client to query the store to reconfigure to correctly construct suitable multiple HDAGs 608. Rules 656 may be based on any property of a file or directory, including name or extension (exact or matching a pattern), owner, writer, permissions, encryption status, size, age, language, character set, tags, decisions by classifiers, and the like. The system can supply a suitable technique to specify rules to enable usage by a program. In some embodiments, multiple such ways can be used, perhaps specific to specific backup clients, following various standards, or embodying different versions of the same standard. The same file can acceptably fall into more than one class 636, a useful property since retention policies can change over time.

Backup clients need not be aware of the retention times associated with the various classes 636, but the system typically supplies an interface for accessing and management of retention time information.

Previous Versions

The illustrative technique for storing multiple retention groups can guarantee that files existing at the time of backup will be kept for controlled amounts of time. Another type of retention policy can be able supported wherein a selected number of prior versions are available for roll-back. Rules for deciding how many versions to keep for a particular file can be kept with the class in the history, enabling client inquiries regarding the rules.

Handling of previous versions is relatively straightforward for a typical backup system. The system simply waits until the appropriate number of versions is stored before starting to delete old versions when new data arrives. With an HDAG-based system, handling of previous versions is tricky due to two main problems. First, unlike with files, the HDAG for a file that no longer exists cannot be computed. The hash to add to the HDAG being creating is not known or, if available somewhere, the HDAG cannot be re-created if not contained in the store. Second, since each HDAG is independent, the prior version, even if contained in the store, is very difficult to find. With the history handling technique described hereinabove, different mount points can be walked through going backward in time until one that is different is found—a very time-consuming process.

Retaining Prior Versions

To retain prior versions, the client-side backup system can be configured to keep track of previous versions of files as the files are uploaded. A straightforward way of tracking file versions is to have a hidden file in each directory that simply contains a list of all or some number of time-stamped hashes of the HDAGs corresponding to files and subdirectories at the time the hashes were computed. More than one backup may be running on the system and each may have associated files or the information can be merged into a single file. That is, each backup may have a dedicated hidden file in each directory, or a single hidden file can be used in each directory that is shared between all backups. When a backup is made and a directory is scanned, the file is read and if a file has changed, the file name, the time (current or last modified) and the hash of the root of the newly-computed HDAG are appended to the file. Optionally, an indication of the system storing the backup (possibly including a signature) can be computed to enable a backup system to determine whether the information is trustworthy, thereby avoiding placement of faulty or suspect data in the HDAGs and also guarding against filling bounded prior value slots with references to versions that are not likely to be in the store.

Alternatively, each file can have an associated, independent hidden "prior versions" file, either in the same directory or in a dedicated "prior versions" subdirectory. In other embodiments, a parallel directory hierarchy or a database can be used, although both have the drawback that if directory trees are moved, prior version information may be lost unless some way of noticing the move and moving the prior version information along with the directories is available. In other embodiments, software running on the client system (possibly within the operating system) can maintain a mapping between files or directories and data. In such an embodiment, the contents of the "prior versions" files (e.g., hashes, timestamps) may be associated with files using this mechanism, for example as described in U.S. patent application Ser. No. 12/627,935 to Evan Kirshenbaum, entitled Focused Backup Scanning, which is incorporated by reference herein. In some such embodiments, the software can monitor use of the file system and note when files are moved, renamed, or copied, allowing prior version information to be available even when the prior versions had different names, if this is considered desirable.

In the implementation of multiple retention groups, at each directory level, rather than simply including a reference to the HDAG representing the current contents of each file or the metadata for each subdirectory, the backup client determines for each file or subdirectory how many prior versions are to be guaranteed and includes references formed of the hashes taken from the prior versions file. Thus the directory node will include the references as strong references. However, a difficulty arises in that the HDAGs for the retention group must be assured to be complete and thus contain all the nodes from roots down to leaves. Completion of the HDAGs can be guaranteed by requesting the store whether the store contains HDAGs that are complete at each level. If the store responds affirmatively, the operation is complete. If the store responds, "no, but the top level node is complete", then status the children is investigated. If the store responds, "the root of the current sub-HDAG is unavailable", then the root node is given and requests can be recursively made to the children, if any. The analysis can proceed because the data exists on the disk and can always be used to recreate the HDAG locally.

But with prior versions, behavior is slightly different. In an illustrative example, H(F) can denote the hash of the root of the HDAG for some file F and H([x,y,z]) is the hash of the root of the HDAG for the collection of x, y, and z. F1 can denote the first version of file F prior to the current version and F2 can denote the immediately previous version before F1. A directory has two files, A and B, and hashes for the past five versions of each are available. A guarantee the past two versions is desired.

First, H([A,B,A1,A2,B1,B2]) are computed with H(A1), H(A2), and so on taken from the prior versions file. The store is requested to indicate whether a complete HDAG rooted at that node exists in the store. If so, no more actions for the directory are warranted.

In another case, the HDAG is distinguished between being incomplete because A or B are unavailable and being incomplete because one of the prior versions is not available. In the latter case, the HDAG cannot be made complete, because the backup client does not have the prior content to send to the store, so sending the store the root for [A,B,A1,A2,B1,B2] is pointless. Instead, the store is asked whether A, B, A1, and the like are available. If all of the prior versions are present, analysis proceeds. If not, the default HDAG cannot be used to represent the directory. For example if all of the children are present except for A2, in some embodiments the directory can be represented by [A,B,A1,B1,B2]. The two prior versions of A are to be kept, but if unavailable further analysis is not possible. That is, the desired behavior is to keep two prior versions but if not available in the store, the prior versions cannot be recreated to add to the store. As disclosed hereinbelow, a weak reference to A2 is available, so that if the reference is somehow added in the future, clients walking the directories will be able to see the reference. Even so, the reference is not guaranteed to be maintained and the HDAG it refers to can be lost again. A concept of a "sticky" reference can be introduced which is partway between a strong reference and a weak reference. Such a child has the property that absence of the child does not cause the HDAG to be considered incomplete, but the node if ever asserted later, would be noticed by the store and immediately considered to be a child for garbage collection purposes. The store is known to have all of the children (if A or B are unavailable, the walk can proceed and the children added), so the root can simply be added. Alternatively, a "two versions" request can be treated as meaning "the most recent two versions" and the store can be asked whether the store has earlier versions A3, A4, and A5 (all at once or singly). For example if A3 is present, the directory representation can change to [A,B,A1,A3,B1,B2].

For large directories with large numbers of prior versions, asking the store about the entire structure every time anything changes can be time consuming. In many cases, most file are unnecessary. If B is the only file that changed and the retention group from the prior backup is unexpired (and the prior versions are known to have come from the backup tool), the prior backup contained [A,B1,A1,A2,B2,B3], and the client can assume that all are still present. Analysis can then proceed by asking only about B, making B complete and then providing [A,B,A1,A2,B1,B2] and then checking for completion. If not complete, the fallback position is to the more complicated strategy described hereinabove.

Alternatively, the HDAG can contain separate lists (represented as separate nodes) for the history of each file. The directory then becomes represented by [A,B,[A1,A2],[B1,B2]]. Now the client asks about A, B, [A1,A2], and [B1,B2]. If A has not changed, then the prior version list is probably still available. The downside is that more nodes are required, and if a file changes, the prior version list will probably not be in the store and will have to be added. The action is likely not worthwhile unless the number of prior versions become very large. If the action is taken, caching (in the prior versions file or elsewhere) the fact that H([A1,A2]) was already computed to be the hash of the prior version list containing A1 and A2 may be worthwhile.

With the illustrative approach, the n prior versions for a file become part of the same retention group as the current version and remains long as the retention group is present.

Enabling Version Browsing

The system enables a user to request information regarding previous versions of a file or directory. The notion of a "prior version" only makes sense in a particular context. HDAG stores are inherently content-addressable wherein two files having the same content also have the same hash, and a pointer to one file is therefore a pointer to the other file. However, what does not follow is that a prior version of one file is necessarily a prior version of the other file. A prior version for a file named "F" within directory D (file D/F) can be defined as the prior version which is either be a content address or a path relative to some content-addressed parent directory.

Directories are represented by nodes with payloads that contain, among other metadata, weak references to file and directory children. A straightforward action is simply to add weak references (preferably time stamped) to prior version within the directory nodes as extra metadata. The number of the weak references is independent of the number of versions with retention guaranteed by any class. Thus the fact that the same directory appears in multiple classes does not preclude the node from being shared among the various HDAGs for the classes. A browsing client when reading a directory node can access historical versions as well as the current version for any file. If the prior version references are time-stamped, requests of the form, "file F as of last Tuesday" are supported as long as the references remain available.

One problem that may arise is that large numbers of prior versions, if kept, likely become the bulk of the data in directory nodes and may slow the system for clients only concerned with current (as-of-backup) versions. To avoid such slowing, the prior version weak references can be split off into a separate node, held as a (strong) child from the directory metadata node, then accessed only when needed. A chain of such nodes can also be used rather than a single big (and growing) list, although slowing access of earlier elements. If desired, a system can implement a hybrid of the methods, for example switching based on the number of versions and the expected use pattern.

Separating Data and Metadata

In many cases, two systems can have identical files because the files are written while installing the same software. The files have different metadata due to installation at different times by a different installer. Just as nodes can be separated when covered by different retention policies, nodes representing data and representing metadata can be separated.

Figure 7:
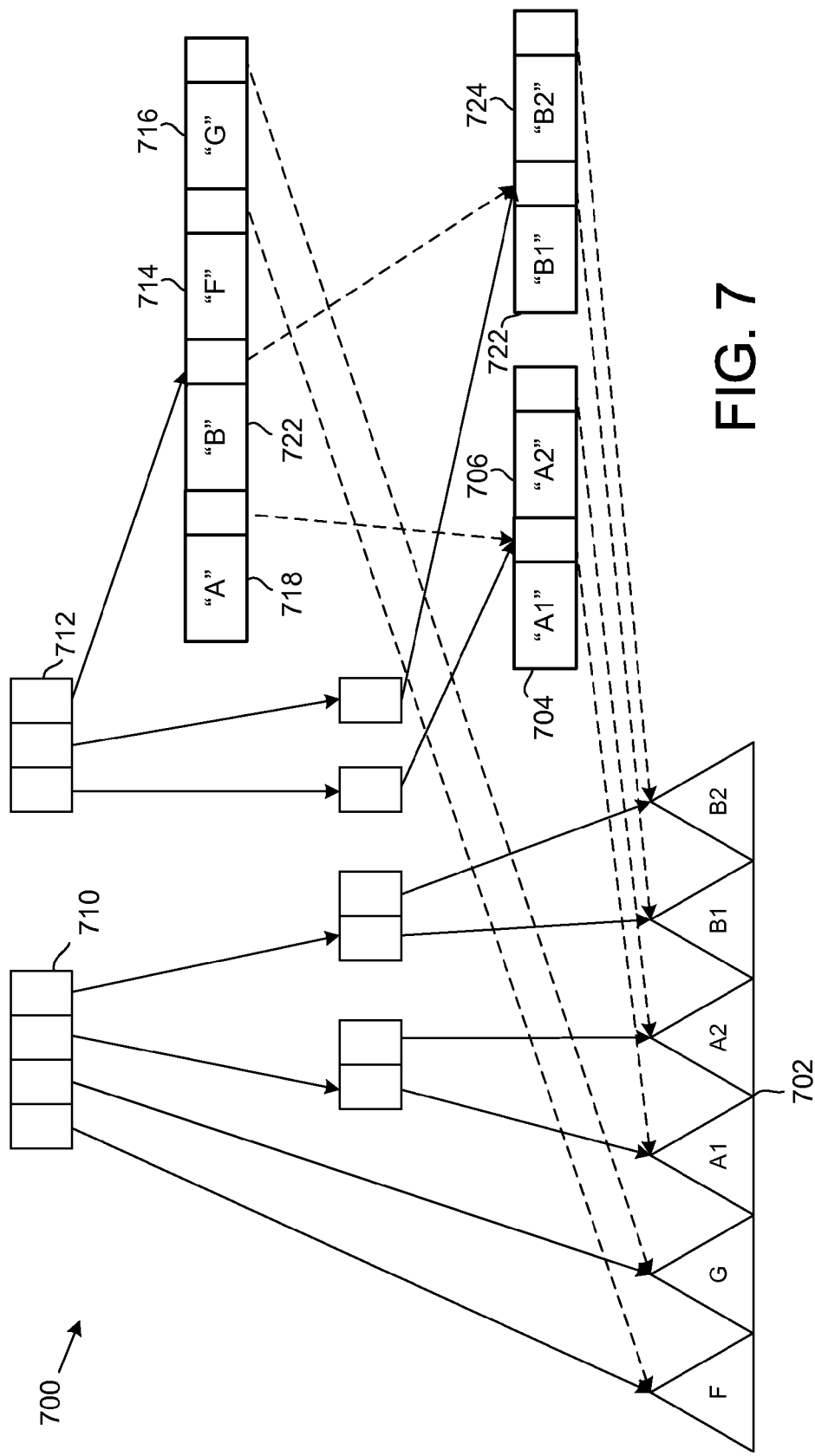
FIG. 7 is a schematic block data diagram showing an example embodiment of HDAG structures for a backup system that separates data from metadata.

Referring to FIG. 7, a schematic block data diagram illustrates an embodiment of HDAG structures 700 for a backup system that separates data from metadata. Two HDAGs can be built in parallel, one for data (files) 710 and the other for metadata (directories) 712. In the illustrative diagram, a particular directory has two files, F 714 and G 716, and two subdirectories A 718 and B 720, which have files A1 704, A2 706, B1 722, and B2 724.

Both the left HDAG 710 representing the data and the right HDAG 712 representing the metadata are shown asserted as roots within a retention group for a class within a history. In embodiments in which the entire directory tree is to be kept for all classes, the separated structure enables all classes to share the same metadata HDAG and only have different data HDAGs.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions (e.g., backup logic). The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the various methods illustrated herein may be implemented as data and instructions (of the software) that are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A storage system comprising:
a storage; and
backup logic that manages data backup in the storage, the backup logic creates multiple hash-directed acyclic graphs (HDAGs) for ones of a plurality of retention policies,
wherein one of the multiple HDAGs represents directories by a first node and a second node to be backed up, and the backup logic performs backup operations using the multiple HDAGs to attain the plurality of retention policies.

2. The storage system according to claim 1, wherein the second node contains references to the first node and contains references to any of the multiple HDAGs corresponding to files or directories governed by a currently active policy of the plurality of retention policies.

3. The storage system according to claim 1 further comprising:
the backup logic to store a backup and associate nodes of one of the multiple HDAGs with a retention group in a multiple-pass process operating upon the retention group and a working set, each of which is individually identifiable, the working set to support more than one retention group and having an individually-associated retention policy.

4. The storage system according to claim 1 wherein:
the backup logic to store retention groups and associate queries as made and nodes as stored with a working set wherein the nodes contained in the working set are not collected as long as the working set is valid.

5. The storage system according to claim 1,
wherein the backup logic performs a backup operation comprising sequencing through at least part of a directory tree, creating the multiple HDAGs, one for each of the plurality of retention policies; and operates subsequent to backup comprising identifying at least one retention group, each associated with one or more HDAG roots and associated with a retention policy of the plurality of retention policies specifying duration of HDAG retention, and further comprising requesting the storage to construct retention groups, identifying in the request retention policy, roots, and group-identification metadata.

6. The storage system according to claim 1,
wherein the backup logic maintains a chronology encapsulating a record for a plurality of related unexpired retention groups in combination with associated ones of the plurality of retention policies and metadata, the chronology comprising a plurality of classes that can be at least one of modified and deleted in response to assertion of backup against the chronology, the classes containing a list of unexpired retention groups and expirations.

7. The method of claim 1, wherein the first node contains a payload of metadata and references to roots of child nodes.

8. The method of claim 7, wherein the references to roots of child nodes allow contents to be obtained if existing in the storage but does not prevent the contents from expiring from storage.

9. A data processing method comprising:
managing data backup comprising:
creating multiple hash-directed acyclic graphs (HDAGs) for ones of a plurality of retention policies, wherein one of the multiple HDAGs represents directories by a first node and a second node to be backed up;
and
executing backup operations using the multiple HDAGs to attain the plurality of retention policies.

10. The method according to claim 9, wherein the second node contains references to the first node and contains references to any of the multiple HDAGs corresponding to files or directories governed by an active policy of the plurality of retention policies.

11. The method according to claim 9 further comprising:
storing a backup;
associating nodes of one of the multiple HDAGs with a retention group in a multiple-pass process operating upon the retention group and a working set, each of which is individually identifiable;
using the working set to support more than one retention group and having an individually-associated retention policy; and
storing retention groups and associating queries as made and nodes as stored with the working set wherein the storage guarantees that as long as the working set is valid, the nodes contained in the working set are not collected.

12. The method according to claim 9 further comprising:
performing a backup operation comprising:
sequencing through at least part of a directory tree; and
creating the multiple HDAGs, one for each of the plurality of retention policies; and
operating subsequent to backup comprising:
identifying at least one retention group, each associated with one or more HDAG roots and associated with a retention policy of the plurality of retention policies specifying duration of HDAG retention;
requesting the storage to construct retention groups; and
identifying in the request retention policy, roots, and group identification metadata.

13. The storage system of claim 9, wherein the first node contains a payload of metadata and references to roots of child nodes.

14. The storage system of claim 13, wherein the references to roots of child nodes allow contents to be obtained if existing in the storage but does not prevent the contents from expiring from the storage.

* * * * *

UNITED STATES PATENT AND TRADEMARK OFFICE
CERTIFICATE OF CORRECTION

PATENT NO. : 8,447,734 B2
APPLICATION NO. : 12/627914
DATED : May 21, 2013
INVENTOR(S) : Evan R. Kirshenbaum It is certified that error appears in the above-identified patent and that said Letters Patent is hereby corrected as shown below:

In the Claims:

In column 20, line 17, in Claim 7, delete "The method of" and insert -- The storage system of --, therefor.

In column 20, line 19, in Claim 8, delete "The method of" and insert -- The storage system of --, therefor.

In column 20, line 48, in Claim 11, delete "wherein the" and insert -- wherein a --, therefor.

In column 20, line 62, in Claim 12, delete "requesting the" and insert -- requesting a --, therefor.

In column 20, line 65, in Claim 13, delete "The storage system of" and insert -- The method of --, therefor.

In column 21, line 1, in Claim 14, delete "The storage system of" and insert -- The method of --, therefor.

Signed and Sealed this
Twenty-seventh Day of August, 2013

Teresa Stanek Rea
*Acting Director of the United States Patent and Trademark Office*